US006289599B1

(12) United States Patent
Leifeld et al.

(10) Patent No.: US 6,289,599 B1
(45) Date of Patent: Sep. 18, 2001

(54) APPARATUS FOR MEASURING THE THICKNESS OF SLIVER BUNDLE FORMED OF A PLURALITY OF SIDE-BY-SIDE RUNNING SLIVERS

(75) Inventors: Ferdinand Leifeld, Kempen; Josef Temburg, Jüchen, both of (DE)

(73) Assignee: Trützschler GmbH & Co. KG, Mönchengladbach (DE)

( * ) Notice: Subject to any disclaimer, the term of this patent is extended or adjusted under 35 U.S.C. 154(b) by 0 days.

(21) Appl. No.: 09/154,823

(22) Filed: Sep. 17, 1998

(30) Foreign Application Priority Data

Sep. 17, 1997 (DE) .................................. 197 40 816
May 2, 1998 (DE) .................................. 198 19 728

(51) Int. Cl.$^7$ .............................. D01H 5/32; G01B 5/06; G01B 7/06; D01G 23/00
(52) U.S. Cl. .................................. 33/501.02; 33/501.03; 19/239; 19/65 A; 19/23; 19/240
(58) Field of Search ............................ 33/501.02, 501.03, 33/501.04, 834; 73/159, 160; 19/239, 0.23, 0.24, 65 A

(56) References Cited

U.S. PATENT DOCUMENTS

| 4,232,447 | * | 11/1980 | Grunder et al. | 33/501.02 |
|---|---|---|---|---|
| 4,648,054 | | 3/1987 | Farah et al. | 73/160 |
| 4,881,415 | | 11/1989 | Hergeth . | |
| 5,123,280 | * | 6/1992 | Baechler | 73/159 |
| 5,157,810 | * | 10/1992 | Wicki | 19/23 |
| 5,237,754 | * | 8/1993 | Oexler | 33/501.02 |
| 5,461,757 | | 10/1995 | Leifeld | 19/239 |
| 5,479,679 | * | 1/1996 | Leifeld | 73/159 |
| 5,544,390 | * | 8/1996 | Hartung et al. | 19/239 |
| 5,611,116 | * | 3/1997 | Leifeld | 73/159 |
| 5,615,453 | * | 4/1997 | Leifeld | 73/159 |
| 5,619,772 | * | 4/1997 | Leifeld | 73/159 |
| 5,659,968 | * | 8/1997 | Leifeld | 33/501.02 |
| 5,697,247 | * | 12/1997 | Zehr | 73/159 |
| 5,755,135 | * | 5/1998 | Strobel et al. | 33/501.02 |
| 5,796,635 | * | 8/1998 | Dammig | 19/239 |
| 5,815,890 | * | 10/1998 | Leifeld | 73/159 |
| 5,943,740 | * | 8/1999 | Slavik et al. | 19/239 |
| 5,983,456 | * | 11/1999 | Leifeld | 19/239 |
| 6,018,129 | * | 1/2000 | Bissette | 73/159 |

(List continued on next page.)

FOREIGN PATENT DOCUMENTS

| 295 621 | 3/1954 | (CH) . |
| 1 011 329 | 6/1957 | (DE) . |
| 1 059 322 | 6/1959 | (DE) . |

(List continued on next page.)

OTHER PUBLICATIONS

Mazura, "SliverMaster—Qualitätssicherung in der Spinnerei–Vorbereitung", Mellian Textilberichte, 10/1995, pp. 802,804.

Grossmann, "Die Regulierstrecke für Baumwolle", Textil–industrie 68, 4/1966, pp. 215–226.

Primary Examiner—Diego Gutierrez
Assistant Examiner—Yaritza Guadalupe
(74) Attorney, Agent, or Firm—Venable; Gabor J. Kelemen

(57) ABSTRACT

An apparatus for measuring the thickness of a plurality of side-by-side running slivers includes a supporting surface guiding the side-by-side running slivers thereon in a single plane; a holding member; and a plurality of sensor elements movably secured to the holding member to be movable in a direction transverse to the plane. Each sliver is contacted by a separate sensor element for causing excursions thereof by thickness fluctuations of the running sliver. Each sensor element is yieldingly pressed against a respective sliver, and each sensor element cooperates with the supporting surface for pressing the running slivers against the supporting surface. An adding device adds the excursions of the sensor elements, and a transducer converts the excursion values into electric pulses.

20 Claims, 3 Drawing Sheets

U.S. PATENT DOCUMENTS

| | | | |
|---|---|---|---|
| 6,058,570 | * | 5/2000 | Baechler ................................ 19/239 |
| 6,088,882 | * | 7/2000 | Leifeld ................................. 19/239 |
| 6,118,082 | * | 9/2000 | Bissette ............................... 19/0.23 |
| 6,119,312 | * | 9/2000 | Leifeld ............................... 19/65 A |
| 6,158,090 | * | 12/2000 | Patelli et al. ........................ 19/239 |
| 6,170,125 | * | 1/2001 | Steinert et al. ..................... 19/65 A |
| 6,175,235 | * | 1/2001 | Obama et al. ................... 33/501.03 |
| 6,199,289 | * | 3/2001 | Baechler .......................... 33/501.02 |

FOREIGN PATENT DOCUMENTS

| | | |
|---|---|---|
| 1 118 068 | 11/1961 | (DE) . |
| 15 10 552 | 1/1970 | (DE) . |
| 21 40 639 | 2/1972 | (DE) . |
| 21 04 886 | 8/1972 | (DE) . |
| 15 10 487 | 4/1975 | (DE) . |
| 30 36 446 | 4/1981 | (DE) . |
| 31 42 051 | 5/1983 | (DE) . |
| 32 12 891 | 10/1983 | (DE) . |
| 38 10 575 | 10/1989 | (DE) . |
| 38 34 110 | 4/1990 | (DE) . |
| 44 04 326 | 10/1994 | (DE) . |
| 37 22 141 | 4/1996 | (DE) . |
| 44 38 882 | 5/1996 | (DE) . |
| 44 38 883 | 5/1996 | (DE) . |
| 44 38 884 | 5/1996 | (DE) . |
| 44 38 885 | 5/1996 | (DE) . |
| 195 28 484 | 2/1997 | (DE) . |
| 2168735 | 8/1973 | (FR) . |
| 2 322 942 | 4/1977 | (FR) . |
| 891232 | 3/1962 | (GB) . |
| 1 345 450 | 1/1974 | (GB) . |
| 2062704A * | 5/1981 | (GB) ................................. 19/239 |
| 2 294 957 | 5/1996 | (GB) . |
| 91/16595 | 10/1991 | (WO) . |

* cited by examiner

APPARATUS FOR MEASURING THE THICKNESS OF SLIVER BUNDLE FORMED OF A PLURALITY OF SIDE-BY-SIDE RUNNING SLIVERS

CROSS REFERENCE TO RELATED APPLICATION

This application claims the priority of German Application No. 197 40 816.8 filed Sep. 17, 1997 and German Application No. 198 19 728.4 filed May 2, 1998, which are incorporated herein by reference.

BACKGROUND OF THE INVENTION

This invention relates to an apparatus for measuring the thickness of a running sliver bundle in a drawing frame. A sliver guide is arranged at the inlet of the drawing unit of the drawing frame for the sliver bundle which is composed of side-by-side inputted slivers. The slivers are guided in a single plane through a measuring member which includes a biased, movable, mechanically contacting sensor element which, in cooperation with a counterface, forms a constriction through which the slivers pass after being densified thereby. The positional changes of the sensor element in response to thickness fluctuations of the running sliver bundle formed of the slivers are converted into electric control pulses by a transducer.

According to a known device which measures the thickness of a sliver bundle and which includes a sliver guide for guiding the sliver bundle at the drawing unit inlet, the walls of the device converge at least partially conically to gather the slivers inputted in one plane. Further, a roll pair is arranged downstream of the sliver guide. The slivers again diverge downstream of the roll pair. The sliver thickness measuring device has a biased, movable sensor element which forms a constriction with a stationary counterface for the throughgoing sliver bundle as outlined above. The sliver thickness is sensed as the densified slivers are guided in the sliver guide side-by-side, while the roll pair withdraws the sensed slivers.

It has further been proposed to densify the side-by-side arranged slivers from above across the width of the sliver bundle. For this purpose the sensor element, in addition to a sensing and densifying motion in the direction of the slivers, also executes a pivotal motion about an axis which is parallel to the running direction of the slivers and thus the sensor element is able to detect that, for example, slivers of unlike thickness are arranged side-by-side. The movable sensor element has a slide face by means of which the slivers are, in their side-by-side relationship, densified and pressed against the stationary counterface. Disadvantageously, in such an arrangement the thickest sliver determines the distance between the sensor element and the counterface, and even a small thickened location in one of the slivers results in a greater distance. The slivers on either side of such a thickened location are thus pulled out of the thus-obtained clearance without having been submitted to thickness sensing.

SUMMARY OF THE INVENTION

It is an object of the invention to provide an improved apparatus of the above-outlined type from which the discussed disadvantages are eliminated and which, in particular, ensures a significantly improved detection of the thickness fluctuations of the slivers and makes possible a more accurate guidance thereof.

This object and others to become apparent as the specification progresses, are accomplished by the invention, according to which, briefly stated, the apparatus for measuring the thickness of a plurality of side-by-side running slivers includes a supporting surface guiding the side-by-side running slivers thereon in a single plane; a holding member; and a plurality of sensor elements movably secured to the holding member to be movable in a direction transverse to the plane. Each sliver is contacted by a separate sensor element for causing excursions thereof by thickness fluctuations of the running sliver. Each sensor element is yieldingly pressed against a respective sliver, and each sensor element cooperates with the supporting surface for pressing the running slivers against the supporting surface. A summation device adds the excursions of the sensor elements, and a transducer converts the excursion values into electric pulses.

By means of the invention according to which all slivers are individually measured for thickness at the inlet of the drawing frame, a differentiated summation result may be obtained in which the thickness of each individual sliver is taken into account. In this manner the evening of thickness fluctuations of all slivers is significantly improved, eventually resulting in a more uniform drawn sliver, and thus an improved yarn may be manufactured.

The invention includes the following additional advantageous features:

All sensor elements are connected with a holding member which is biased by a force-exerting member and to which the sum of the displacements of the individual sensor elements is applied.

The sensor element is biased by a spring or the like.

The sensor elements are constituted by leaf springs.

The leaf springs are cantilevered.

The counterface is the circumferential surface of a rotating roll.

The measuring member is arranged upstream of the sliver guide.

The measuring member is integrated in the sliver guide.

The sensor elements are connected with a rotatably or shiftably supported holding member which is biased by a force-exerting member and to which the sum of the displacements of the individual sensor elements is applied and wherein the end of the sensor elements includes a securing region fixedly connected with the holding member and further wherein the sensor elements form a moving means for the rotary of shifting motion of the biased holding member and the sensing region is formed by the other end of the sensor elements.

The sensor elements are leaf springs.

The sensor elements lie against the end face of a feed table.

A clearance is provided between the free ends of the sensor elements and the free end of the feed table.

The feed table or the feed roll are supported in a movable, spring-biased manner; the biasing springs are harder than the springs constituting the sensor elements.

The feed table is stationarily held relative to the direction of excursion of the sensor elements.

One end of the sensor elements may lift off the holding member.

An abutment is provided for limiting the excursion of the sensor elements.

The leaf springs are arranged parallel to one another.

The leaf springs are soft in the direction of the displacement of the feed table.

The leaf springs are stiff in the direction oriented from the feed table to the holding member.

The holding member is a longitudinal beam.

The holding member extends parallel to the feed roll.

The holding member is resistant to torsion forces.

At the end face of the holding member at least one torsion bar is disposed in an axial direction.

The holding member is supported in a rotary bearing at least at one end thereof.

A measuring element detects the rotary motion of the holding member.

The measuring element is an inductive path sensor.

The measuring element includes expansion strips.

In an apparatus in which the thickness variations are mechanically sensed over the width of the sliver bundle by the individual sensor elements, the thickness deviations are summarized by the common holding member by means of forming an average value.

The inputted fiber quantity for the drawing frame is altered as a function of the deviation of the actual value (average value) from a desired value.

The sensor elements are situated above the rotary roll forming a counter surface.

The leaf springs extend into the bight between two cooperating rolls between which the slivers pass.

The feed roll is stationarily supported.

The holding member is a hollow extruded member.

The extruded holding member is of aluminum or an aluminum alloy.

The holding member is provided at its end faces with a radially extending axle such as a bar or a pin.

BRIEF DESCRIPTION OF THE DRAWINGS

FIG. 2b is a schematic side elevational view of the construction shown in FIG. 2a.

FIG. 3b is a schematic side elevational view of the structure shown in FIG. 3a.

FIG. 6b is a sectional front elevational view of the embodiment of FIG. 6a.

DESCRIPTION OF THE PREFERRED EMBODIMENTS

Figure 1:
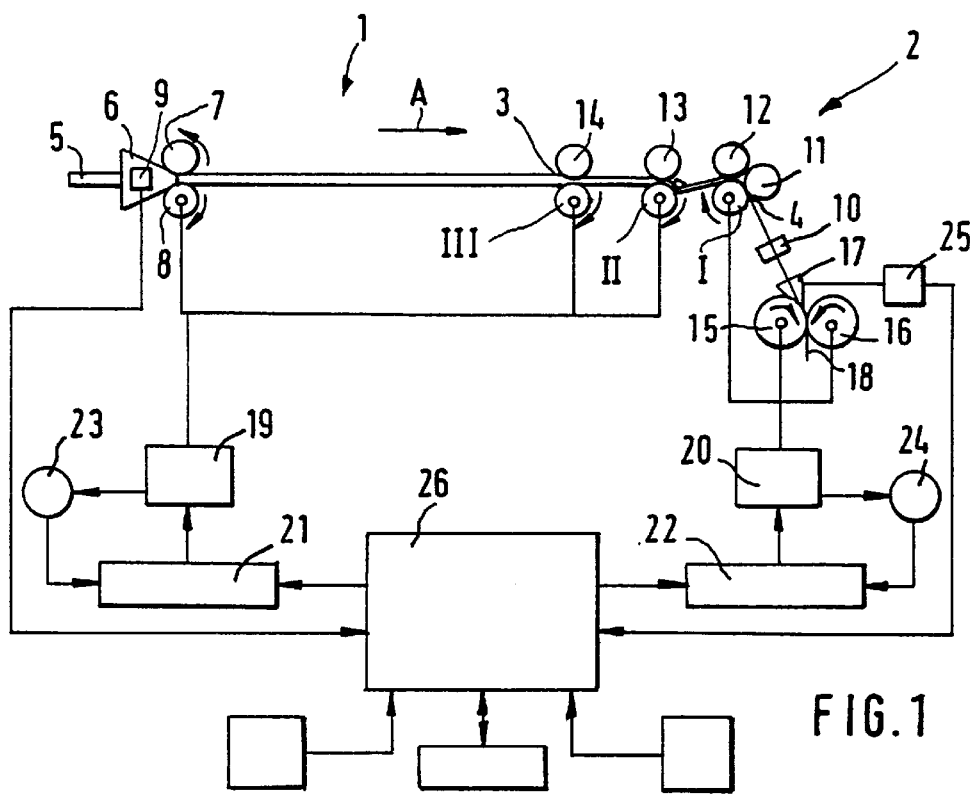
FIG. 1 is a schematic side elevational view, with block diagram, of a regulated drawing frame incorporating the invention.

FIG. 1 illustrates a drawing frame 1 which may be an HSR model manufactured by Trützschler GmbH & Co. KG. The drawing frame 1 has a drawing unit 2 flanked upstream and downstream by a drawing unit inlet 3 and a drawing unit outlet 4, respectively. The slivers 5 are withdrawn from coiler cans and enter a sliver guide 6 and are thereafter pulled therethrough by cooperating withdrawing rolls 7, 8 to cause the slivers 5 to run past the measuring member 9. The drawing unit 2 is a four-over-three drawing unit, that is, it has a lower output roll I, a lower mid roll II and a lower input roll III as well as four upper rolls 11, 12, 13 and 14. In the drawing unit 2 a drawing (stretching or drafting) of the sliver bundle formed of a plurality of slivers 5 takes place. The drawing unit has preliminary and principal drawing fields. The roll pairs 14/III and 13/II constitute the preliminary drawing field while the roll pair 13/II and the roll unit 11, 12/I form the principal drawing field. At the drawing unit outlet 4 the drawn slivers 5 reach a sliver guide 10 and are pulled through a sliver trumpet 17 by means of withdrawing rolls 15, 16 and are combined by the sliver trumpet 17 into a sliver 18 which is subsequently deposited into coiler cans.

The withdrawing rolls 7, 8, the lower intake roll III and the lower mid roll II which are coupled to one another mechanically, for example, by a toothed belt, are driven by a regulating motor 19 with a pre-inputted desired value. The upper rolls 14 and 13 are driven by friction from the respective lower rolls III and II. The lower output roll I and the withdrawing rolls 15, 16 are driven by a main motor 20. The regulating motor 19 and the main motor 20 are provided with a respective regulator 21 and 22. The rpm regulation is effected by means of a closed regulating circuit in which a tachometer 23 is coupled with the regulating motor 19 and a tachometer 24 is coupled with the main motor 20. At the drawing unit inlet 3 a magnitude of the sliver which is proportional to the sliver mass, such as its cross section, is measured by the inlet measuring member 9. At the drawing unit outlet 4 the cross section of the exiting sliver 18 is determined by a sliver outlet measuring organ 25 associated with the sliver trumpet 17.

A central computer unit 26 (control-and-regulating device), such as a microcomputer or a microprocessor transmits to the regulator 21 a setting of the desired magnitude for the regulating motor 19. The measuring magnitudes of the two measuring members 9 and 25 are applied to the central computer unit 26 during the sliver drawing process. The central computer unit 26 determines the desired value for the regulating motor 19 from the measuring values of the inlet measuring member 9 and from the desired value for the cross section of the exiting sliver 18. The measuring values of the outlet measuring member 25 serve for monitoring the exiting sliver 18. With the aid of such a regulating system fluctuations in the cross section of the inputted slivers 5 may be compensated for by a suitable regulation of the drawing process and thus an evening of the outputted sliver 18 may be achieved.

Figure 2A:
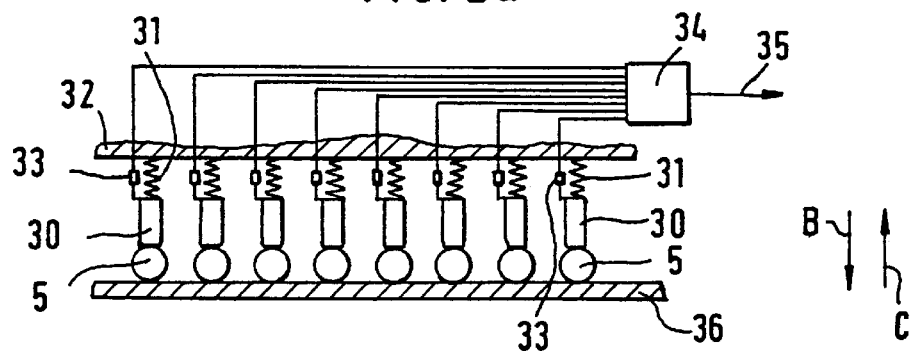
FIG. 2a is a schematic sectional front elevational view of a preferred embodiment of the invention comprising a plurality of sensor elements and a stationary counterface.
Figure 2B:
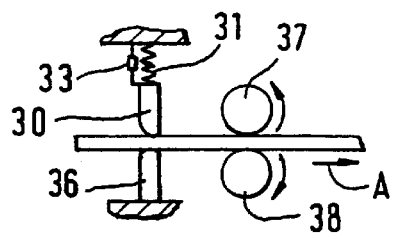

According to FIGS. 2a and 2b, a plurality of side-by-side arranged sensor elements 30 are provided which are displaceable in the direction of the arrows B and C perpendicularly to the plane in which the slivers 5 lie. With one end of each sensor element 30 a respective spring 31 is associated which, at its other end, is secured to a throughgoing stationary holding member 32. With each sensor element a transducer, such as an inductive path sensor is associated which converts the excursions of the sensor elements 30 into electric signals which are applied to a common electric adding device 34. The summation signal 35 is used for regulation as shown in FIGS. 1 and 3b. A throughgoing stationary slide element (supporting surface) such as a slide strip faces the other end of the sensor elements 30. The slivers 5 pass between the sensor elements 30 and the slide element (counterface) 36. Downstream of the measuring device 9 two cooperating driven rotary transport rolls 37 and 38 are arranged. In this manner, the thickness of all slivers 5 is individually measured at the inlet of the drawing frame, and a summation signal 35 is formed from the individual measuring signals.

Figure 3A:
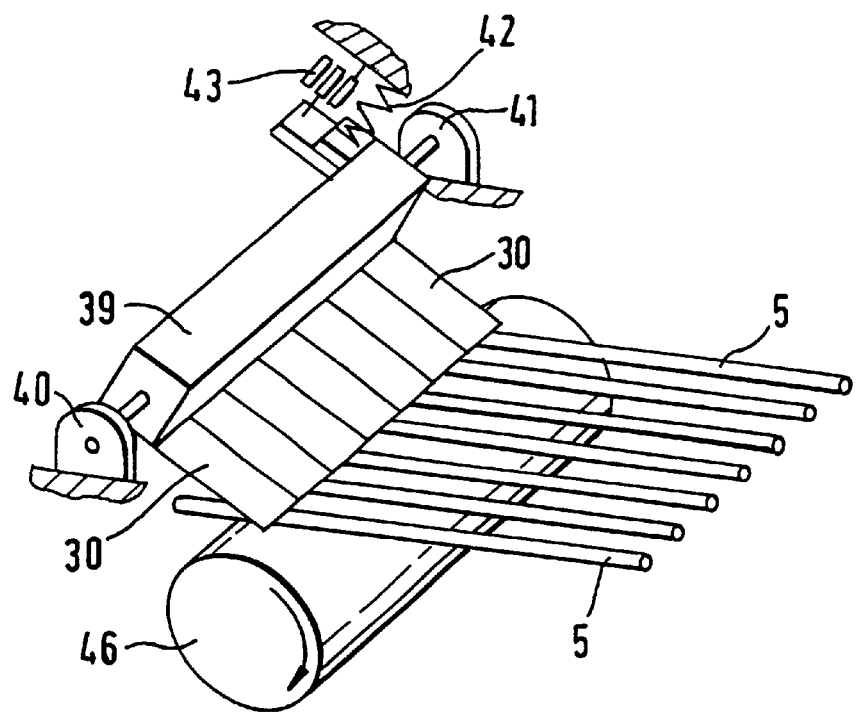
FIG. 3a is a schematic perspective view of another preferred embodiment including a plurality of sensor elements and a rotary counterface.
Figure 3B:
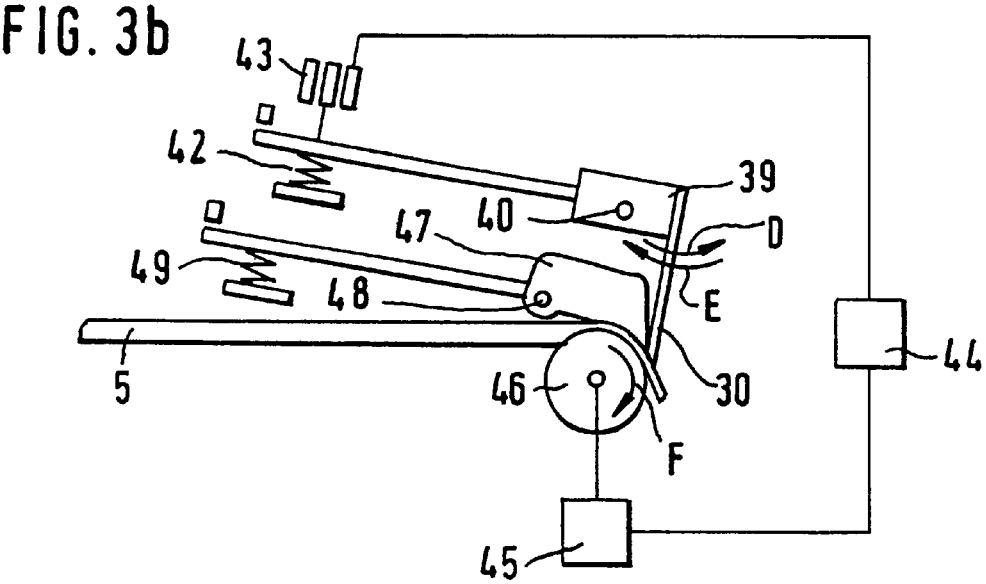

According to FIGS. 3a and 3b, the sensor elements 30 are formed by a plurality of side-by-side arranged leaf springs (measuring plates) which are affixed at one end to a common summation holder member 39 such as a summation beam, a measuring lever or the like. The other, free end of the leaf springs 30 is pressed against the respective slivers 5. The mechanical summation holder member 39 is at both ends rotatably supported in bearings 40, 41 and is biased by a spring 42 in a clockwise direction as viewed in FIGS. 3a and 3b. Further, with the summation holder member 39 a sensor 43 is associated which, according to FIG. 3b, applies an electric summation signal to a regulator 44 connected to a drive motor 45 which rotates a roll 46. The roll 46 which rotates in the direction F forms a movable counterface (supporting surface) for all the leaf springs 30. Between the holder member 39 and the roll 46 a throughgoing feed table 47 is disposed for pivotal motion about a support 48 biased clockwise by a spring 49. The slivers 5 are pulled in between the nip defined by the roll 46 and the feed table 47. At the output side of the nip the slivers 5 are sensed for thickness by the leaf springs 30 which are movable in a direction indicated by the arrows E and D. This embodiment needs only a single sensor 43 sensing the rotary displacement of the summation element 39.

Figure 4:
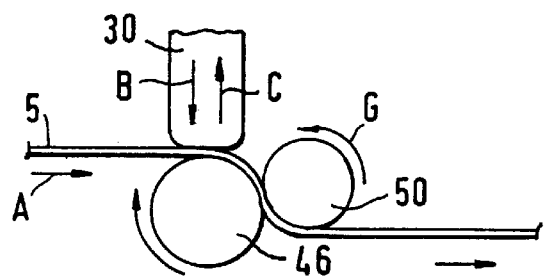
FIG. 4 is a schematic side elevational view of a variant of the construction shown in FIGS. 3a and 3b.

According to FIG. 4, the roll 46 is associated with a guide roll 50 which rotates in the direction G and which serves for guiding and advancing the slivers 5.

Figure 5:
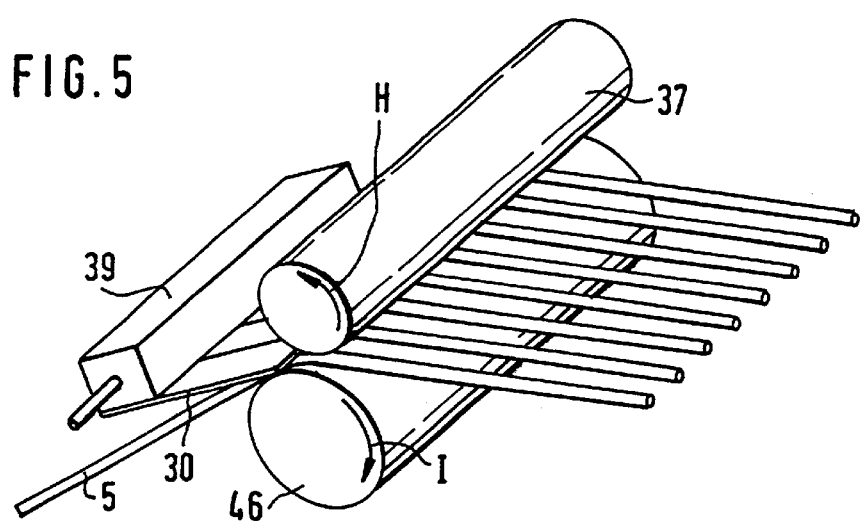
FIG. 5 is a schematic perspective view of yet another preferred embodiment of the invention including two cooperating transporting rolls.

Turning to FIG. 5, the roll 46 is associated with a transporting roll 37. The rolls 37, 46 rotate in the direction of the respective arrows H and I and define a bight, terminating in a nip through which the slivers 5 pass. The leaf springs (sensors) 30 extend into the bight and press on the slivers 5 from above, while the rotating upper face of the roll 46 serves as a counterface (supporting surface).

Figure 6A:
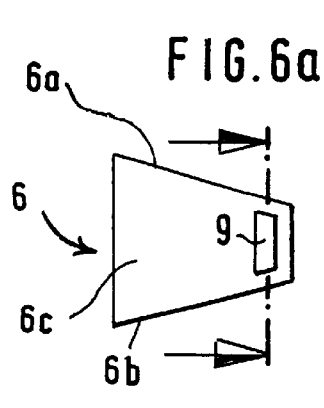
FIG. 6a is a schematic top plan view of a preferred embodiment including a sliver guide with an integrated measuring device.
Figure 6B:
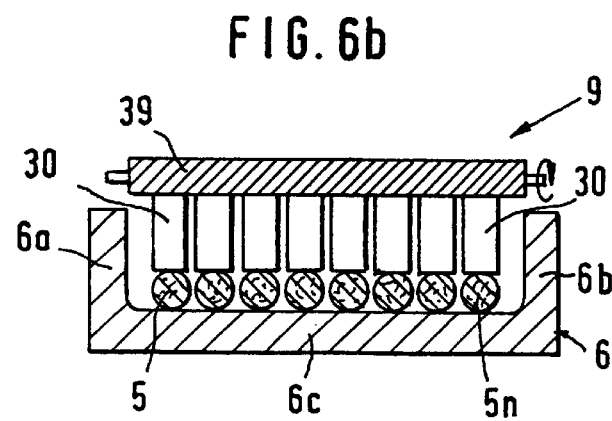

FIGS. 6a and 6b show an embodiment where the measuring device 9 is integrated in the sliver guide 6 having lateral walls 6a and 6b and a bottom wall 6c. The leaf springs 30 cantilevered to the summation holding member 39 press down on a respective sliver 5 with their other, free end. This arrangement makes possible to sense a varying number of slivers, for example, instead of the shown eight slivers, only six slivers may be sensed. The lateral walls 6a, 6b cause the slivers to laterally converge, that is, the sliver bundle is laterally densified independently from the number of the slivers 5. With each sliver 5 a respective sensor element 30 may be associated so that an individual measuring of the slivers 5 is achieved. It is, however, also feasible to associate a plurality of sensor elements 30 with a single sliver 5 or to assign a single sensor element 30 with more than one sliver 5. The summation holding member 39 serves in each instance for adding the excursions of the sensor elements 30. In this manner, a differentiated summation is achieved.

It will be understood that the above description of the present invention is susceptible to various modifications, changes and adaptations, and the same are intended to be comprehended within the meaning and range of equivalents of the appended claims.

What is claimed is:
1. A drawing frame comprising:
    (a) a plurality of sliver drawing roll pairs;
    (b) means for simultaneously advancing a plurality of side-by-side running slivers through said roll pairs;
    (c) means for combining the slivers to form an output sliver;
    (d) means for discharging the output sliver; and
    (e) an drawing frame for detecting thickness variations of the side-by-side running slivers; said drawing frame including
        (1) a supporting surface guiding the side-by-side running slivers thereon in a single plane;
        (2) a holding member;
        (3) a plurality of sensor elements movably secured to said holding member to be movable in a direction transverse to said plane; each sliver being contacted by a separate said sensor element for causing excursions thereof by thickness fluctuations of the running sliver;
        (4) pressing means for yieldingly pressing each said sensor element against a respective said sliver; each sensor element cooperating with said supporting surface for pressing the running slivers against said supporting surface;
        (5) summation means for adding the excursions of said sensor elements; and
        (6) transducer means for converting excursion values into electric pulses representing the thickness variations of the running slivers.
2. The drawing frame as defined in claim 1, further comprising
    (a) means for rotatably supporting said holding member; said sensor elements being secured to said holding member such that said sensor elements exert a first torque on said holding member; said first torque representing a sum of excursions of said sensor elements; and
    (b) resilient means continuously exerting a second torque to said holding member; said second torque opposing said first torque.
3. The drawing frame as defined in claim 1, wherein said pressing means includes a separate spring engaging respective said sensor elements.
4. The drawing frame as defined in claim 1, further comprising an abutment for limiting excursions of said sensor elements.
5. The drawing frame drawing frame as defined in claim 1, wherein said sensor elements are leaf springs; further comprising a feed table cooperating with said supporting surface to define therewith a nip through which said slivers pass; means for movably supporting said feed table in a direction of motion; further wherein said leaf springs are relatively soft in said direction of motion of said feed table and said leaf springs are relatively hard in a direction oriented from said feed table to said holding member.
6. The drawing frame as defined in claim 1, wherein said holding member is a longitudinal beam.
7. The drawing frame as defined in claim 1, further comprising
    (a) means for rotatably supporting said holding member; and
    (b) a measuring element connected to said holding member for measuring rotary displacements of said holding member caused by excursions of said sensor elements.
8. The drawing frame as defined in claim 1, wherein each said sensor element is a leaf spring.

9. The drawing frame as defined in claim 8, wherein each leaf spring has opposite first and second end portions; said leaf springs being attached to said holding member at said first end portion and cooperating with said supporting surface at said second end portion.

10. The drawing frame as defined in claim 1, further comprising a rotary roll having a circumferential face constituting said supporting surface.

11. The drawing frame as defined in claim 10, wherein said rotary roll has a rotary axis; further wherein said holding member is a longitudinal beam oriented parallel to said rotary axis.

12. The drawing frame as defined in claim 10, wherein said rotary roll is generally horizontally oriented; and further wherein said sensor elements are disposed above said rotary roll.

13. The drawing frame as defined in claim 10, wherein said rotary roll is a first rotary roll and said sensor elements are leaf springs; further comprising a second rotary roll cooperating with said first rotary roll and defining a bight therewith; said leaf springs having an end extending into said bight.

14. The drawing frame as defined in claim 10, further comprising a feed table cooperating with said rotary roll to define therewith a nip through which said slivers pass; said feed table having an end face, and said sensor elements lying against said end face.

15. The drawing frame as defined in claim 14, wherein each said sensor element has a free end arranged to engage a respective said running sliver; said free end of said sensor elements being spaced from said end face of said feed table.

16. The drawing frame as defined in claim 14, wherein said sensor elements are leaf springs; further comprising a spring urging said rotary roll and said feed table to one another; said spring being harder than said leaf springs.

17. The drawing frame as defined in claim 14, further comprising means for movably supporting said feed table; said means for movably supporting said feed table including means for preventing displacements of said feed table in a direction parallel to excursions of said sensor elements.

18. The drawing frame as drawing frame as defined in claim 1, wherein said drawing frame includes a sliver guide through which said slivers pass.

19. The combination as defined in claim 18, wherein said drawing frame is disposed upstream of said sliver guide as viewed in a direction of sliver advance through said sliver guide.

20. The combination as defined in claim 18, wherein said drawing frame is integrated in said sliver guide.

\* \* \* \* \*